(12) United States Patent
Komada

(10) Patent No.: US 12,146,563 B2
(45) Date of Patent: Nov. 19, 2024

(54) DRIVE UNIT

(71) Applicant: TOYOTA JIDOSHA KABUSHIKI KAISHA, Toyota (JP)

(72) Inventor: Hideaki Komada, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/531,825

(22) Filed: Dec. 7, 2023

(65) Prior Publication Data

US 2024/0102546 A1   Mar. 28, 2024

(30) Foreign Application Priority Data

Dec. 26, 2022   (JP) ................................. 2022-208807

(51) Int. Cl.
| | |
|---|---|
| *B60K 1/00* | (2006.01) |
| *B60K 17/16* | (2006.01) |
| *B60L 15/00* | (2006.01) |
| *F16H 37/08* | (2006.01) |
| *F16H 57/037* | (2012.01) |
| *F16H 57/02* | (2012.01) |

(52) U.S. Cl.
CPC ............ *F16H 57/037* (2013.01); *B60K 1/00* (2013.01); *B60K 17/165* (2013.01); *B60L 15/007* (2013.01); *F16H 37/082* (2013.01); *B60K 2001/001* (2013.01); *F16H 2057/02034* (2013.01); *F16H 2057/02052* (2013.01)

(58) Field of Classification Search
CPC ................ F16H 57/037; F16H 37/082; F16H 2057/02034; F16H 2057/02052; B60K 1/00; B60K 2001/001; B60K 17/165; B60L 15/007

USPC ................................. 475/150, 200, 204, 206
See application file for complete search history.

(56) References Cited

U.S. PATENT DOCUMENTS 6,059,684 A * 5/2000 Sasaki ...................... B60K 1/00
                                                                 180/65.6
6,413,186 B1   7/2002 Hattori
(Continued)

FOREIGN PATENT DOCUMENTS

| JP | 4349688 B2 | 10/2009 | |
|---|---|---|---|
| JP | 5589772 B2 | 9/2014 | |
| WO | WO-2012159789 A1 * | 11/2012 | ............... B60K 1/00 |

OTHER PUBLICATIONS

English Translation of WO2012159789A1; http://translationportal.epo.org; May 15, 2024 (Year: 2024).*

*Primary Examiner* — Roger L Pang

(74) *Attorney, Agent, or Firm* — Oliff PLC

(57) ABSTRACT

A drive unit may be configured to drive a pair of left and right wheels of a vehicle. The drive unit may include: a motor; a planetary gear mechanism including a sun gear; a parallel gear coaxially fixed to a carrier; a first and bearing rotatably supporting the carrier and the parallel gear; and a differential mechanism meshing with the parallel gear and configured to distribute power from the parallel gear to the pair of left and right wheels. The sun gear may be connected to the motor and power may be input to the planetary gear mechanism from the motor. The power may be input to the parallel gear from the carrier. The first bearing may be disposed on one side relative to the carrier and the parallel gear and the second bearing may be disposed on other side of the carrier and the parallel gear.

3 Claims, 4 Drawing Sheets

(56) References Cited

U.S. PATENT DOCUMENTS

| | | | |
|---|---|---|---|
| 11,054,001 B1* | 7/2021 | Tamai | F16H 1/2827 |
| 2014/0315675 A1* | 10/2014 | Watanabe | F16H 48/36 |
| | | | 475/150 |
| 2019/0309838 A1* | 10/2019 | Cooper | B60K 23/04 |
| 2022/0203827 A1* | 6/2022 | Engerman | F16H 63/3416 |

* cited by examiner

DRIVE UNIT

REFERENCE TO RELATED APPLICATION

This application claims priority from Japanese Patent Application No. 2022-208807 filed on Dec. 26, 2022. The entire content of the priority application is incorporated herein by reference.

BACKGROUND ART

The technology disclosed herein relates to a drive unit for vehicles.

In a drive unit for vehicles described in Japanese Patent No. 4349688, a parallel gear and a planetary gear mechanism are aligned coaxially with the rotation shaft of a motor. The parallel gear is located closer to the motor and the planetary gear mechanism is located farther from the motor. The parallel gear meshes with a differential gear. Two bearings are located near both ends of the parallel gear.

DESCRIPTION

The drive unit of Japanese Patent No. 4349688 requires, in addition to the two bearings on both sides of the parallel gears, a bearing for supporting the planetary gear mechanism on its farther side from the motor.

A drive unit disclosed herein is configured to drive a pair of left and right wheels of a vehicle. The drive unit may comprise a motor; a planetary gear mechanism including a sun gear, wherein the sun gear is connected to the motor and power is input to the planetary gear mechanism from the motor; a parallel gear coaxially fixed to a carrier of the planetary gear mechanism, wherein the power is input to the parallel gear from the carrier; a first bearing and a second bearing rotatably supporting the carrier and the parallel gear; and a differential mechanism meshing with the parallel gear and configured to distribute power from the parallel gear to the pair of left and right wheels. The first bearing may be disposed on one side relative to the carrier and the parallel gear, and the second bearing may be disposed on other side of the carrier and the parallel gear.

The parallel gear is not limited to structures in which teeth are parallel to the rotation axis. It encompasses the concept including gears in which teeth are at an angle to the rotation axis (e.g., helical gears). In the above structure, the parallel gear and the carrier of the planetary gear mechanism are fixed to each other, thus integrated. The first and second bearings support this integrated structure on its both sides. Thus, the parallel gear and the planetary gear mechanism can be supported compactly and rigidly by the two bearings. This allows for a reduction in the size of the drive unit.

Figure 1:
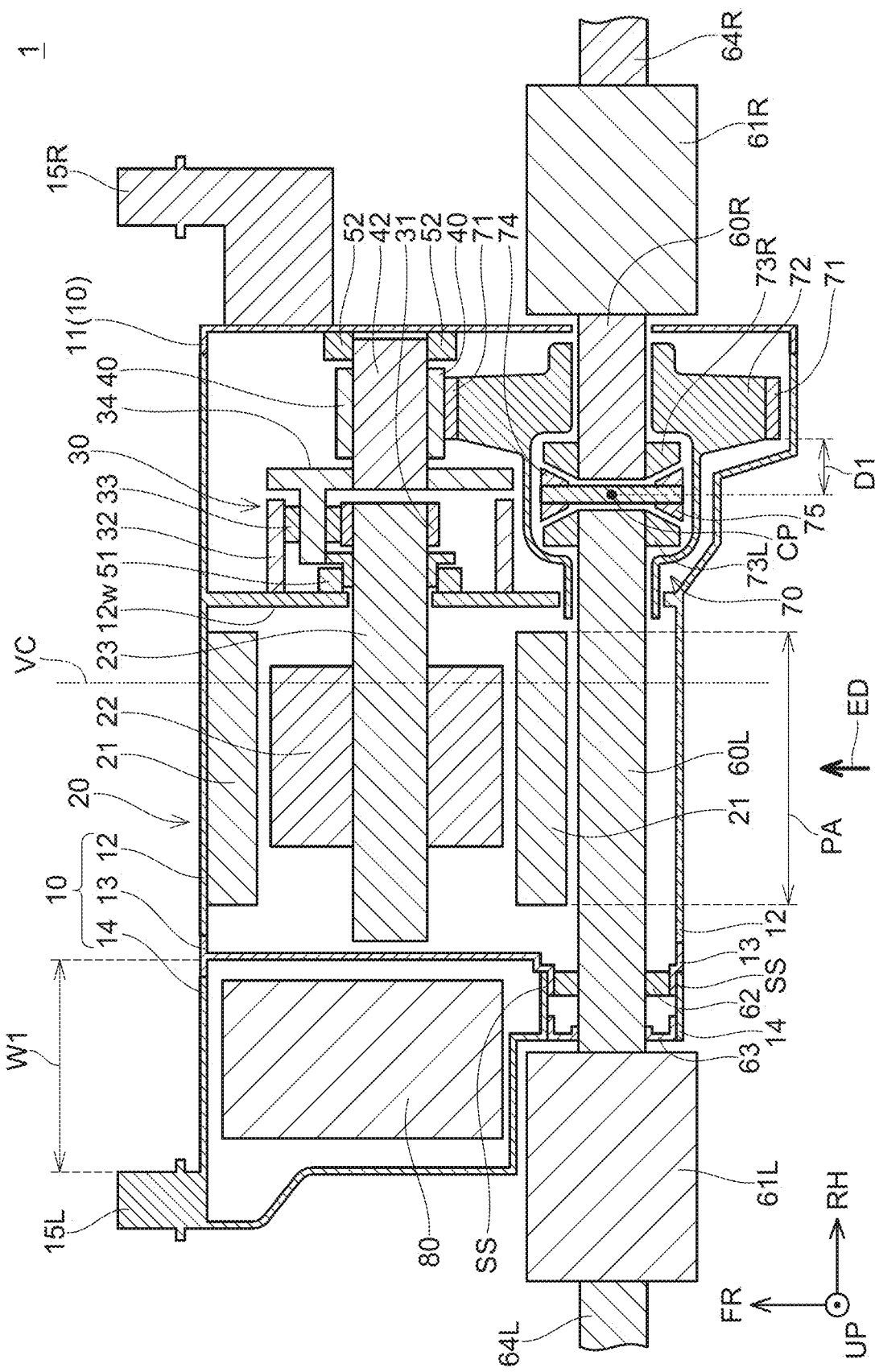
FIG. 1 is a cross-sectional view exemplary illustrating a drive unit 1.

The drive unit may further comprise an inboard joint; and a shaft connecting the inboard joint and the differential mechanism to each other, the shaft being parallel to a rotation shaft of the motor and facing the rotation shaft. The differential mechanism may be located on one side relative to a stator of the motor in a longitudinal direction of the shaft. The inboard joint may be located on other side relative to the stator in the longitudinal direction of the shaft. As viewed in a direction perpendicular to the shaft and the rotation shaft and in which the shaft and the rotation shaft overlap, the differential mechanism may not overlap the stator and the inboard joint may not overlap the stator.

The stator is a large-diameter component of the motor. Further, the inboard joint is also a large-diameter component. The above configuration allows for avoidance of interference between the stator, which is a large-diameter component, and the inboard joint, which is a large-diameter component. Therefore, the distance between the rotation shaft of the motor and the shaft can be reduced. The size of the drive unit can thus be reduced.

The drive unit may further comprise an inverter disposed adjacent to the motor. The planetary gear mechanism may be located on one side relative to the stator in a longitudinal direction of the rotation shaft. The inverter may be located on other side relative to the stator in the longitudinal direction of the rotation shaft.

This configuration enables effective use of the space that is adjacent to the motor and opposite the planetary gear mechanism. The size of the drive unit can be reduced.

The differential mechanism may comprise a ring gear meshing with the parallel gear. The ring gear may be offset from a center of the differential mechanism in a direction away from the motor.

The ring gear is a large-diameter component of the differential mechanism. The above configuration allows the distance between the stator and the ring gear to be increased. A large space that is not interfered by the stator, which is a large-diameter component, and the ring gear, which is a large-diameter component, can be secured. Thus, effective use of space is possible.

The drive unit may further comprise a case that houses the motor, the planetary gear mechanism, the parallel gear, the first bearing, the second bearing, the differential mechanism, and the shaft. A thickness of a part of the case where the shaft is disposed may be less than a thickness of a part of the case where the motor is disposed.

This configuration allows a space to be secured near the part of the case where the shaft is disposed in the thickness direction. Effective use of space is possible.

Representative, non-limiting examples of the present disclosure will now be described in further detail with reference to the attached drawings. This detailed description is merely intended to teach a person of skill in the art further details for practicing preferred aspects of the present. Furthermore, each of the additional features and teachings disclosed below may be utilized separately or in conjunction with the other. Furthermore, each of the additional features and teachings disclosed below may be utilized separately or in conjunction with other features and teachings to provide improved drive units.

Moreover, combinations of features and steps disclosed in the following detailed description may not be necessary to practice the disclosure in the broadest sense, and are instead merely to describe representative examples of the disclosure. Furthermore, various features of the above-described and below-described representative examples, as well as the various independent and dependent claims, as well as the various independent and dependent claims, as well as the various independent and dependent claims, are instead taught merely to particularly describe representative examples of the disclosure. Furthermore, various features of the above-described and below-described representative examples, as well as the various independent and dependent claims, may be combined in ways that are not specifically and explicitly en Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the claimed subject matter. All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible In addition, all value ranges or indications of groups of entities are intended to disclose every possible intermediate value or intermediate entity for the purpose of original written disclosure, as well as for the purpose of restricting the claimed subject matter. In addition, all value ranges or indications of groups of entities are intended to disclose for the purpose of the original written disclosure, as well as for the purpose of restricting the claimed subject matter.

EMBODIMENTS

Configuration of Drive Unit 1

Figure 2:
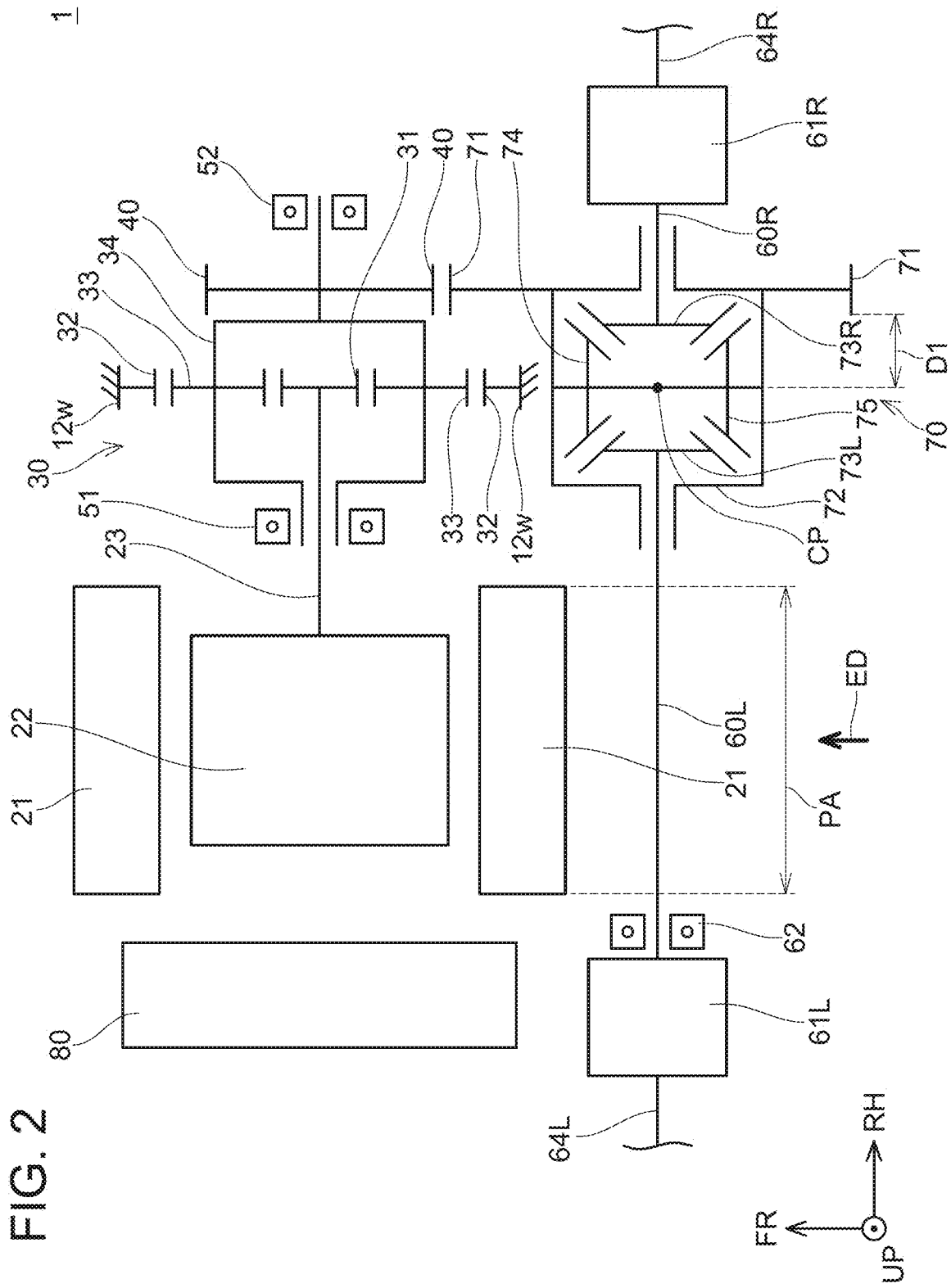
FIG. 2 is a skeleton diagram for illustrating the structure of the drive unit 1.

FIG. 1 is a cross-sectional view exemplary illustrating a drive unit 1 of an electric vehicle. FIG. 2 is a skeleton diagram for explaining the structure of the drive unit 1 shown in FIG. 1. Here, a direction FR in the drawings indicates a front direction of front-rear direction of the vehicle, a direction RH indicates a right direction of left-right direction (or width direction) of the vehicle, and a direction UP indicates an up direction of up-down direction of the vehicle. The same applies to the other drawings.

The drive unit 1 is a device configured to drive a pair of left and right wheels (not shown) of the vehicle. The drive unit 1 mainly comprises a case 10, a motor 20, a planetary gear mechanism 30, a parallel gear 40, a first bearing 51, a second bearing 52, side gear shafts 60L and 60R, inboard joints 61L and 61R, and a differential mechanism 70.

Figure 3:
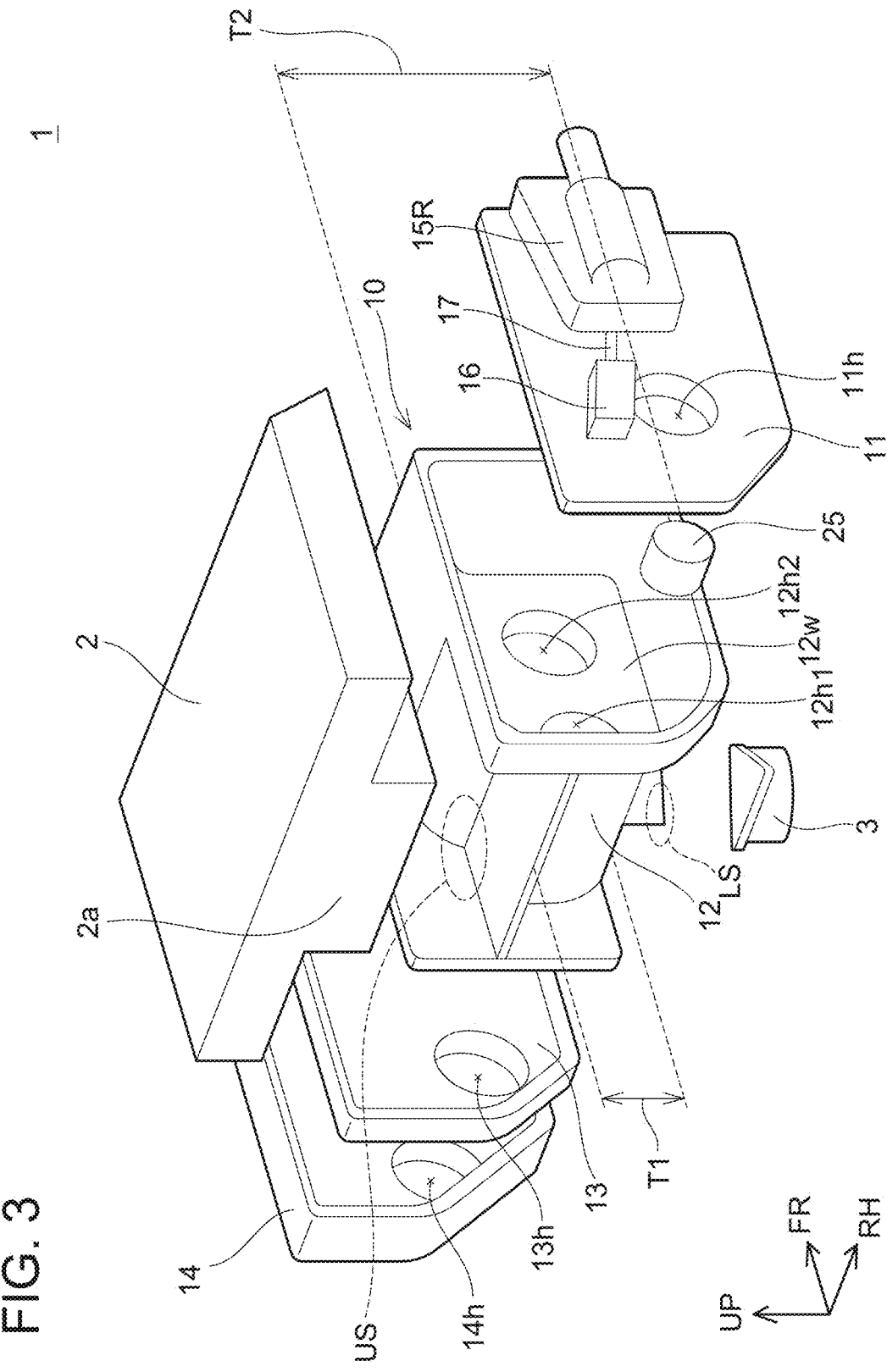
FIG. 3 is an exploded perspective view of a case 10.

The case 10 houses components, including the motor 20, the planetary gear mechanism 30, the parallel gear 40, the first bearing 51, the second bearing 52, the side gear shafts 60L and 60R, the differential mechanism 70, etc. FIG. 3 shows an exploded perspective view of the case 10. In FIG. 3, the major components such as the motor 20, the planetary gear mechanism 30, the side gear shafts 60L and 60R, the differential mechanism 70, etc. are not illustrated. The case 10 has a structure in which a gear cover 11, a center case 12, a motor cover 13, and an inverter cover 14 are arranged side by side in the width direction of the vehicle. These four members are fastened together to form the case 10.

The gear cover 11 includes a hole 11h through which the side gear shaft 60R passes. A mounting bracket 15R is fastened to the gear cover 11. The center case 12 includes a center wall 12w therein. The center wall 12w includes a hole 12h1 through which the side gear shaft 60L passes and a hole 12h2 through which a first rotation shaft 23 of the motor 20 passes. The motor cover 13 includes a hole 13h through which the side gear shaft 60L passes. The inverter cover 14 includes a hole 14h through which the side gear shaft 60L passes. The inverter cover 14 is formed integrally with a mounting bracket 15L.

An electric oil pump 25 is disposed near the center wall 12w. An oil path, which is not shown, is also formed in the center wall 12w. The oil path is a tunnel-shaped hole and integrally formed in the center wall 12w. The electric oil pump 25 circulates oil through the oil path. Since the oil path is formed in the form of a case hole, external piping is not necessary. This allows for a reduction in the size of the drive unit 1 and a reduction in manufacturing costs.

The motor 20 comprises a stator 21, a rotor 22, and the first rotation shaft 23. The center wall 12w of the center case 12 is located between the motor 20 and the planetary gear mechanism 30. The planetary gear mechanism 30 comprises a sun gear 31, a ring gear 32, a planetary gear 33, and a carrier 34. The sun gear 31 is fixed to an end of the first rotation shaft 23. In this way, the sun gear 31 is connected to the motor 20, and power is input to the sun gear 31 from the motor 20. The ring gear 32 is fixed to the center wall 12w. The carrier 34 is fixed to a second rotation shaft 42. The second rotation shaft 42 is coaxially aligned with the first rotation shaft 23. The parallel gear 40 is disposed on the second rotation shaft 42. In other words, the carrier 34 is fixed coaxially with the parallel gear 40 via the second shaft 42. In the planetary gear mechanism 30, power is input to the sun gear 31, the ring gear 32 is fixed, and power is output from the carrier 34. The power from the carrier 34 is input to the parallel gear 40.

The first bearing 51 supports the planetary gear mechanism 30 on the left side thereof. The second bearing 52 supports the parallel gear 40 on the right side thereof. In other words, the first bearing 51 is located on one side relative to the carrier 34 and the parallel gear 40, and the second bearing 52 is located on the other side relative to the carrier 34 and the parallel gear 40. The carrier 34 and the parallel gear 40 are supported by the first bearing 51 and the second bearing 52 such that they are integrally rotatable.

The differential mechanism 70 distributes the power from the parallel gear 40 to the pair of left and right wheels (not shown). The differential mechanism 70 comprises a ring gear 71, a differential case 72, side gears 73L and 73R, and pinion gears 74 and 75. The ring gear 71 is disposed on an outer surface of the differential case 72. The ring gear 71 meshes with the parallel gear 40. The pinion gears 74 and 75 are supported in the differential case such that they are rotatable. The side gears 73L and 73R mesh with the pinion gears 74 and 75. The midpoint of a line connecting the centers of the opposing side gears 73L and 73R corresponds to a center CP of the differential mechanism 70.

The ring gear 71 is offset from the center CP of the differential mechanism 70 by a distance D1 in a direction away from the motor 20 (in RH direction). This offset has the following advantage. The ring gear 71 is a large-diameter component of the differential mechanism 70. The offset by the distance D1 allows the distance between the stator 21 and the ring gear 71 to be increased. This allows large upper space US and lower space LS, which will be described later, to be secured. Thus, effective use of space is possible.

The side gear shaft 60L connects the side gear 73L and an inboard joint 61L to each other. The side gear shaft 60L is parallel to the first rotation shaft 23 of the motor 20. The side gear shaft 60L faces the first rotation shaft 23 in the front-rear direction of the vehicle. The side gear shaft 60R connects the side gear 73R and an inboard joint 61R to each other. Drive shafts 64L and 64R are connected to the inboard joints 61L and 61R, respectively. The inboard joints 61L and 61R are constant-velocity joints.

The positional relationship between the motor 20, the side gear shaft 60L, and the differential mechanism 70 is described below. The differential mechanism 70 is located on the right side relative to the stator 21 of the motor 20 in a longitudinal direction (RH direction) of the side gear shaft 60L. The inboard joint 61L is located on the left side relative to the stator 21 in the longitudinal direction of the side gear shaft 60L. Here, a viewing direction ED is defined as follows. The viewing direction ED is perpendicular to the side gear shaft 60L and the first rotation shaft 23. As viewed in the viewing direction ED, the side gear shaft 60L and the first rotation shaft 23 overlap each other. Further, a projected area PA is defined as an area obtained by projecting the area where the stator 21 is located to the rear of the vehicle. As viewed in the viewing direction ED, the differential mechanism 70 does not overlap the stator 21 and the inboard joint 61L does not overlap the stator 21. In other words, the differential mechanism 70 and the inboard joint 61L are not in the projected area PA.

This configuration has the following advantages. The stator 21 is a large-diameter component of the motor 20. The inboard joint 61L is also a large-diameter component. The above configuration allows for avoidance of interference between the stator 21, which is a large-diameter component, and the inboard joint 61L, which is a large-diameter component. Therefore, the distance between the first rotation shaft 23 of the motor 20 and the side gear shaft 60L can be reduced. The size of the drive unit 1 can thus be reduced.

In order to avoid the interference between the stator 21 and the inboard joint 61L, the side gear shaft 60L is extended further to the left to position the inboard joint 61L in a left half of the vehicle. As a result, the inboard joints 61L and 61R can be positioned almost symmetrically with respect to a vehicle centerline VC in the vehicle width direction. This allows the drive shafts 64L and 64R to have the same length. Since the left-right balance is evened, torque steer can be suppressed.

The side gear shaft 60L is rotatably supported by a bearing 62. The bearing 62 is fixed to the motor cover 13. An oil seal 63 is located at the inverter cover 14.

A seal SS is formed between the motor cover 13 and the inverter cover 14. The seal SS is formed by engagement (spigot joint) between a mating surface and the outer circumference of the bearing 62. The seal SS prevents oil in the motor cover 13 from leaking toward an inverter 80. The application of the spigot joint allows for a reduction in the size of the seal SS.

The inverter 80 is disposed adjacent to the motor 20. The inverter 80 is located on the left side relative to the stator 21 in the longitudinal direction (RH direction) of the first rotation shaft 23. The planetary gear mechanism 30 is located on the right side relative to the stator 21 in the longitudinal direction of the first rotation shaft 23.

Structure Outside of Case 10

As shown in FIG. 3, a power supply unit 2 and a water-cooled oil cooler 3 are further arranged outside the case 10. The power supply unit 2 comprises various electrical components such as an AC charger, a DC distributor, a DC relay, a DCDC converter, etc. The water-cooled oil cooler 3 circulates cooling water through a cooling water path, which is not shown. In this embodiment, the cooling water path is disposed in the motor cover 13.

A thickness of a space in the center case 12 where the side gear shaft 60L is located is termed a thickness T1. A thickness of a space in the center case 12 where the motor 20 is located is termed a thickness T2. The thickness T1 is less than the thickness T2. Thus, an upper space US is secured above the space where the side gear shaft 60L is located. Also, a lower space LS is secured below the space where the side gear shaft 60L is located.

The power supply unit 2 includes a projection 2a corresponding to the upper space US. When the power supply unit 2 is placed on top of the case 10, the projection 2a can be positioned in the upper space US. Since the upper space US can be created at a dead space otherwise, the dead space can be effectively utilized as a space for the placement of the power supply unit 2. The height of the drive unit 1 is relatively reduced with the power supply unit 2 mounted thereon.

The water-cooled oil cooler 3 can be placed in the lower space LS. Since the lower space LS can be created at a dead space otherwise, the dead space can be effectively utilized as a space for the placement of the water-cooled oil cooler 3. The size of the drive unit 1 is relatively reduced with the water-cooled oil cooler 3 mounted therein.

In this embodiment, the cooling water path formed in the motor cover 13 has a front port closer to the front of the vehicle and a rear port closer to the rear of the vehicle. The front port can be selected as the inlet for cooling water and the rear port can be selected as the outlet for cooling water, or vice versa. Thus, the inlet and outlet for cooling water can be appropriately changed depending on the mounting position (Fr/Rr) of the drive unit 1 on the vehicle and/or driving scheme (FF/RR/AWD) of the drive unit 1. This allows the drive unit 1 to be used commonly in a variety of vehicles regardless of the mounting position (Fr/Rr), thus enabling cost reduction.

Structure of Mounting Bracket

Figure 4:
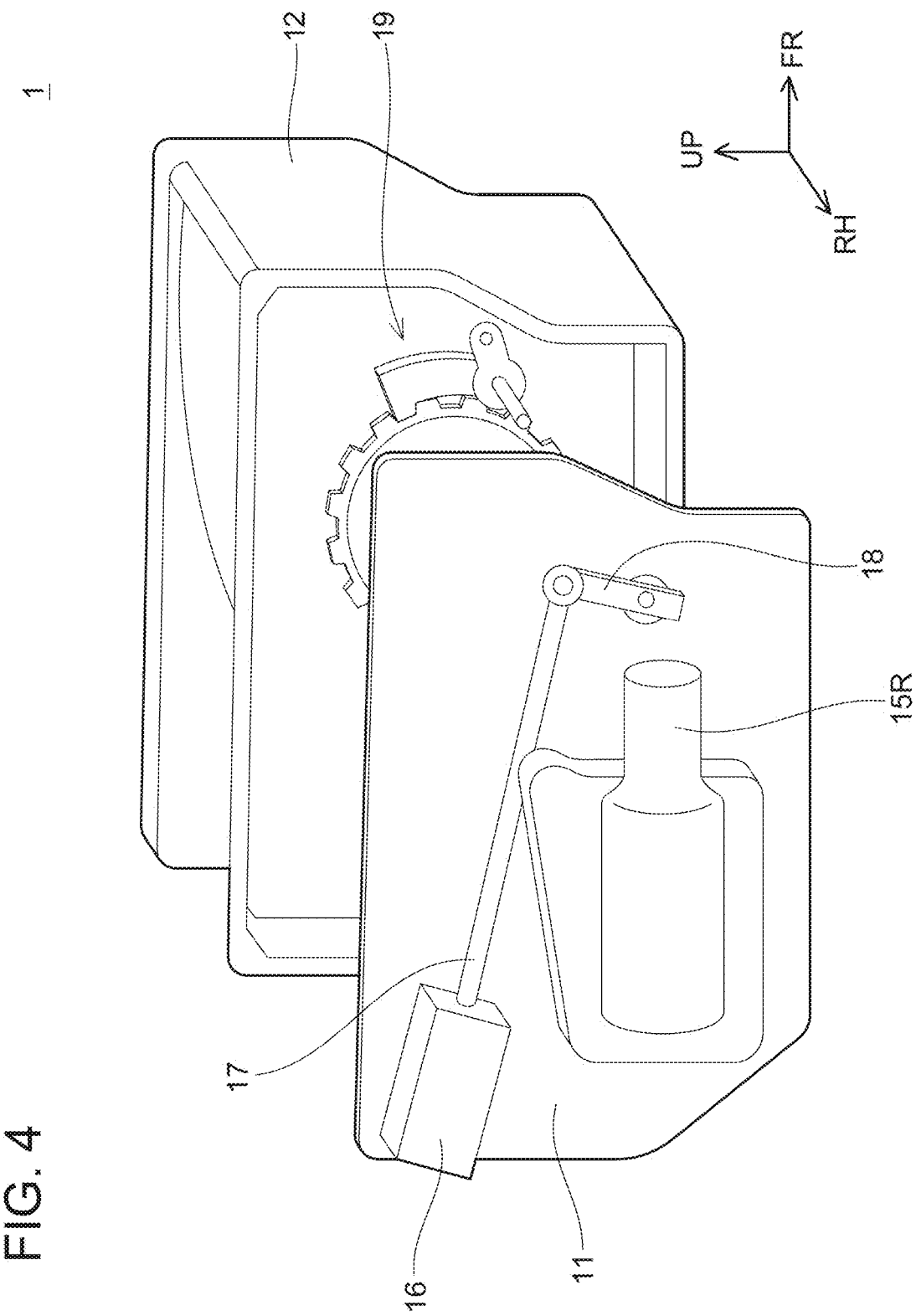
FIG. 4 is an exploded perspective view in the vicinity of a mounting bracket 15R.

FIG. 4 shows an exploded perspective view in the vicinity of the mounting bracket 15R. The drive unit 1 further comprises a park lock actuator 16, a rod 17, an outer lever 18, and a park lock module 19. The park lock actuator 16 and the outer lever 18 are connected to each other via the rod 17. The mounting bracket 15R is fastened to the gear cover 11 so as to cover the outer lever 18. The park lock module 19 comprises an engagement part and a parking gear. The park lock actuator 16 causes the engagement part to engage with the parking gear, thereby the vehicle is locked.

The above structure has the following advantages. Owing to the presence of the rod 17, the park lock actuator 16 can be located near the perimeter of the gear cover 11. The park lock actuator 16 can thus be located without interfering with the space for the mounting bracket 15R. The spaces for the both can be secured.

As shown in FIG. 1, the mounting bracket 15L is formed integrally with the inverter cover 14. For example, they may be integrally formed by casting. Compared to the mounting bracket 15R, which is fixedly fastened to the gear cover 11, the mounting bracket 15L, which is integrated with the inverter cover 14, requires less space in the vehicle width direction. Therefore, a width W1 of a mounting space for the inverter 80 in the vehicle width direction can be sufficiently secured.

Effects

In the structure of the drive unit 1 according to this embodiment, the parallel gear 40 and the carrier 34 of the planetary gear mechanism 30 are fixed to each other, thus integrated. The first bearing 51 and the second bearing 52 support the integrated structure on opposite sides thereof. Thus, the parallel gear 40 can be supported by one second bearing 52. The number of bearings can be reduced, compared to a conventional structure in which the parallel gear 40 is supported by two bearings located on both sides of the parallel gear 40. Further, the parallel gear 40 and the planetary gear mechanism 30 can be supported compactly and rigidly by the first and second bearings 51 and 52. The size of the drive unit 1 can be reduced.

In order to avoid the interference between the stator 21 and the inboard joint 61L, the side gear shaft 60L is extended to position the inboard joint 61L further to the left. This creates a space adjacent to the motor 20 and opposite the planetary gear mechanism 30. In the structure of the drive unit 1 according to this embodiment, the inverter 80 is disposed in this space. Since effective use of the space is possible, the size of the drive unit 1 can be reduced.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A drive unit configured to drive a pair of left and right wheels of a vehicle, the drive unit comprising:
   a motor;
   a planetary gear mechanism including a sun gear, wherein the sun gear is connected to the motor and power is input to the planetary gear mechanism from the motor;
   a parallel gear coaxially fixed to a carrier of the planetary gear mechanism, wherein the power is input to the parallel gear from the carrier;
   a first bearing and a second bearing rotatably supporting the carrier and the parallel gear;
   a differential mechanism meshing with the parallel gear and configured to distribute power from the parallel gear to the pair of left and right wheels,
   wherein the first bearing is disposed on one side relative to the carrier and the parallel gear and the second bearing is disposed on other side of the carrier and the parallel gear;
   an inverter disposed adjacent to the motor, the planetary gear mechanism being located on one side relative to a stator of the motor in a longitudinal direction of a rotation shaft, and the inverter being located on other side relative to the stator in the longitudinal direction of the rotation shaft;
   an inboard joint; and
   a shaft connecting the inboard joint and the differential mechanism to each other, the shaft being parallel to the rotation shaft of the motor and facing the rotation shaft, wherein
   the differential mechanism is located on one side relative to a stator of the motor in a longitudinal direction of the shaft,
   the inboard joint is located on other side relative to the stator in the longitudinal direction of the shaft, and
   as viewed in a direction perpendicular to the shaft and the rotation shaft and in which the shaft and the rotation shaft overlap, the differential mechanism does not overlap the stator, the inboard joint does not overlap the stator, and the inverter does overlap the inboard joint.

2. The drive unit according to claim 1, wherein
   the differential mechanism comprises a ring gear meshing with the parallel gear, and
   the ring gear is offset from a center of the differential mechanism in a direction away from the motor.

3. The drive unit according to claim 2, wherein
   the drive unit further comprises a case that houses the motor, the planetary gear mechanism, the parallel gear, the first bearing, the second bearing, the differential mechanism, and the shaft, and
   a thickness of a part of the case where the shaft is disposed is less than a thickness of a part of the case where the motor is disposed.

* * * * *